(No Model.)

B. F. DOUTHIT.
TRANSPLANTING IMPLEMENT.

No. 500,476. Patented June 27, 1893.

Witnesses
B. S. Ober
W. S. Duvall

Inventor
Benjamin F. Douthit,
By his Attorneys,
C. A. Snow & Co.

UNITED STATES PATENT OFFICE.

BENJAMIN F. DOUTHIT, OF WALHALLA, SOUTH CAROLINA, ASSIGNOR OF TWO-THIRDS TO HIRAM A. H. GIBSON AND JOSEPH J. NORTON, OF SAME PLACE.

TRANSPLANTING IMPLEMENT.

SPECIFICATION forming part of Letters Patent No. 500,476, dated June 27, 1893.

Application filed March 15, 1893. Serial No. 466,094. (No model.)

*To all whom it may concern:*

Be it known that I, BENJAMIN F. DOUTHIT, a citizen of the United States, residing at Walhalla, in the county of Oconee and State of South Carolina, have invented a new and useful Transplanting Implement, of which the following is a specification.

My invention relates to transplanting implements; the objects in view being to provide an implement of cheap and simple construction adapted to be conveniently operated without the necessity of stooping, and to form uniform holes for the transplanting of tobacco, cabbage, sweet potatoes, and other plants, and at the same time of forming the holes for the reception of these plants to compress the soil thereabout so as to prevent the return of the soil into the hole when the device is removed.

With these objects in view the invention consists in certain features of construction hereinafter specified and particularly pointed out in the claim.

Figure 1:
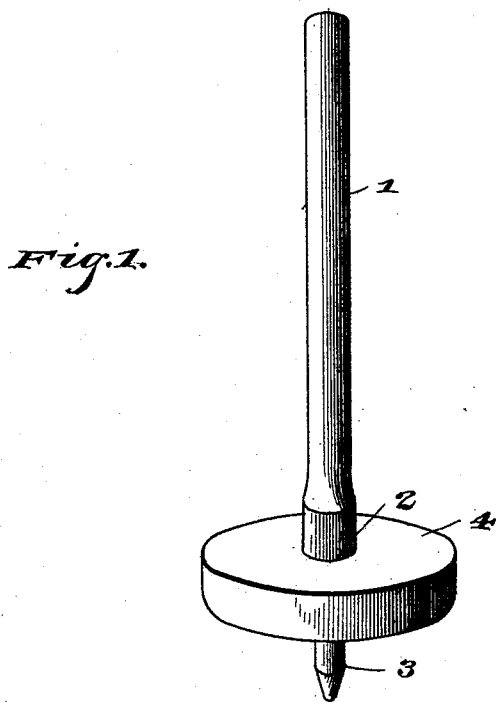
Figure 2:
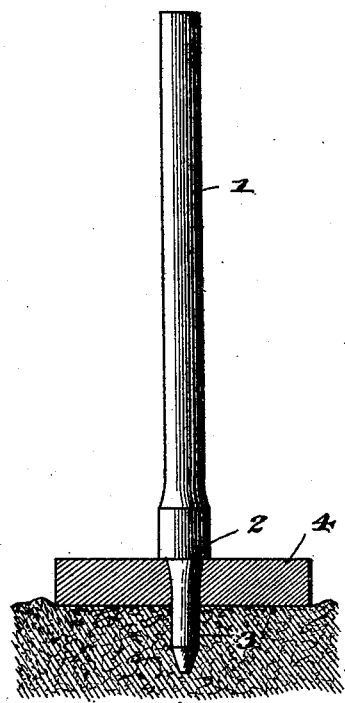

Referring to the drawings:—Figure 1 is a perspective view of a transplanting implement embodying my invention. Fig. 2 is a longitudinal sectional view, the implement being shown in operative position in the ground.

Like numerals of reference indicate like parts in both the figures of the drawings.

In practicing my invention I provide a handle or staff 1 of a suitable size to afford a convenient grip or hand-hold, and produce near the lower end of the same a shoulder 2, in this instance annular, beyond which the handle is reduced and shaped to form a penetrating-point or dibble 3, the same being in this instance conical.

4 designates a disk, the same having a central perforation agreeing with the penetrating-point or dibble and fitted over the same and abutting against the shoulder 2.

The parts may be composed of metal, or wood, or a combination of both as may be desired, and the operation thereof is as follows:— The operator moving along the line in which the transplanting is to take place at intervals raises and lowers with force the implement, jabbing the dibble-end into the soil, thus forming a conical opening for the reception of the plant, and by the impact of the disk upon the soil surrounding the opening, the said soil is packed or molded in such manner as to prevent its loosening and consequent return into the hole thus formed when the dibble has been removed.

By means of my implement the operation of transplanting is greatly facilitated and its labor reduced.

Having described my invention, what I claim is—

The herein described transplanting implement, the same consisting of a handle having a stop-shoulder, formed thereon near its lower end and below the shoulder shaped to form a pointed or conical dibble, and an impact-disk having a central opening corresponding with and fitted over the dibble and bearing against the shoulder, substantially as specified.

In testimony that I claim the foregoing as my own I have hereto affixed my signature in the presence of two witnesses.

BENJAMIN F. DOUTHIT.

Witnesses:
D. P. ROBINS,
P. R. GIBSON.